No. 785,057. PATENTED MAR. 14, 1905.
G. STEVENSON.
DRAW BAR.
APPLICATION FILED JULY 14, 1904.

WITNESSES
Jos. J. Hosler
Minnie F. Anthony

INVENTOR
George Stevenson,
BY
Harry Frease,
ATTORNEY

No. 785,057. Patented March 14, 1905.

UNITED STATES PATENT OFFICE.

GEORGE STEVENSON, OF RIVERSDALE, NEW ZEALAND.

DRAW-BAR.

SPECIFICATION forming part of Letters Patent No. 785,057, dated March 14, 1905.

Application filed July 14, 1904. Serial No. 216,511.

*To all whom it may concern:*

Be it known that I, GEORGE STEVENSON, a subject of the King of Great Britain, residing at Riversdale, in the county of Otago and Colony of New Zealand, have invented a new and useful Improvement in Draw-Bars, of which the following is a specification.

The invention relates to the draw-bar of a wagon or other vehicle, as a threshing-machine or water-tank, which is adapted to be drawn by a traction-engine or other motor; and the object of the improvement is to provide means for guiding or steering the wagon when it is drawn by a cable from the motor at a distance. This object is attained by the construction, arrangement, and mechanism illustrated in the accompanying drawings, in which—

Figure 1:
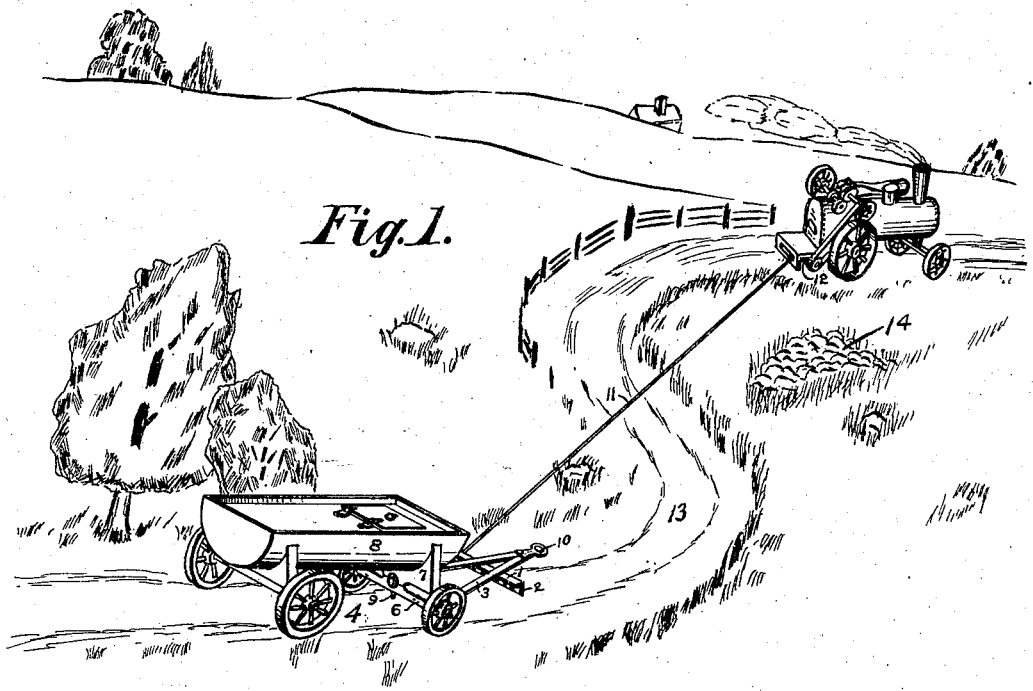
Figure 2:
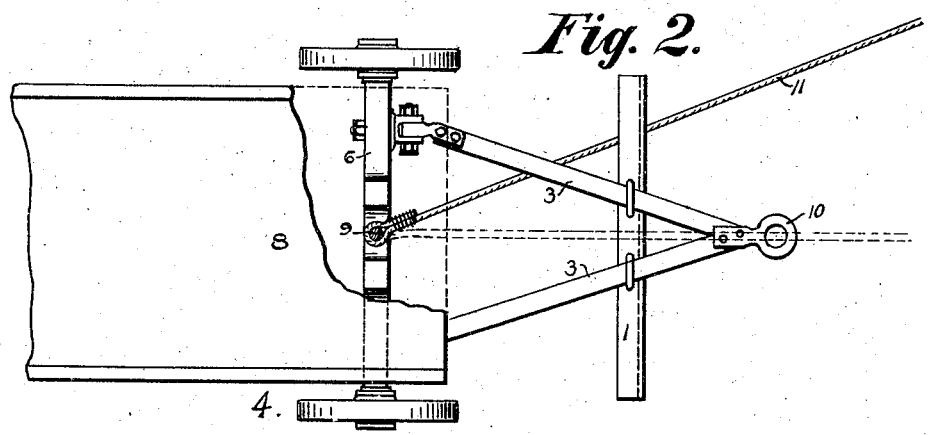
Figure 3:
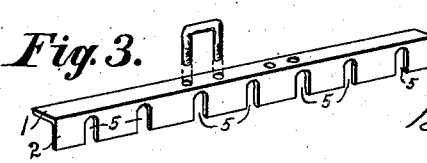

Figure 1 is a perspective view of an engine drawing a tank-wagon, illustrating the use of the improvement; Fig. 2, a plan view of the draw-bar and part of the wagon; Fig. 3, a perspective view of the angle-bar.

Similar numerals refer to similar parts throughout the drawings.

When drawing a wagon along a road or across the fields, hills and rough places are often encountered and the engine finds its load too heavy and it is frequently convenient for the engine to run ahead alone some distance and then to draw the wagon up to it by means of a cable; but in so doing, unless there is some special steering mechanism on the wagon, which is not usually the case, difficulty is found in guiding it along a meandering road or to pass obstacles which may intervene between the wagon and the engine. This difficulty is overcome by providing the transverse bar 1, having the depending flange 2 on and preferably near the forward end of the ordinary draw-bar 3 of the wagon 4, in which flange are provided the series of notches 5. The draw-bar is connected in the usual manner to the front axle 6 of the wagon, which in turn is pivotally connected to the forward bolster 7, on which the wagon-body 8 rests, preferably by the usual vertical king-bolt 9. The wagon is usually coupled to the engine by the eye 10 on the front end of the draw-bar; but when the engine finds its load too heavy it can leave the wagon and go up a hill or other place to the full length of the rope or cable 11, which is adapted to be connected to the wagon near or preferably directly to the king-bolt and to be wound on the drum 12 of the engine, after which the wagon is drawn up to the engine by winding the cable on the drum.

When it is convenient and practicable for the wagon to be drawn directly toward the engine, the draft-cable is entered in the middle notch of the transverse bar and then has the relative position as shown by broken lines in Fig. 2; but when it is necessary to guide the wagon to travel at an angle from the direct line between it and the engine, as for the purpose of causing it to travel along the meanderings of the roadway 13 or to avoid an intervening obstacle, as the pile of stones 14, the cable is placed in one of the lateral notches of the transverse bar and the wagon is then guided along the desired course. It is evident that the course of the wagon can be changed at will within the limits of the transverse bar by entering the draft-cable in the various notches, whereupon the straightening of the cable by its tension will swing the draw-bar and the front axle around on the vertical pivot to bring the particular notch in line between the king-bolt and the engine, and the tautness of the cable will hold the draw-bar firmly in this relation.

What I claim as my invention, and desire to secure by Letters Patent, is—

1. A wagon having an axle and a draw-bar pivoted thereto, there being a transverse bar on the draw-bar having a series of notches therein, and a draft-cable attached to the wagon near the pivotal point and adapted to be entered in the several notches.

2. A wagon having an axle pivoted thereto, a transverse bar connected to the axle in front thereof, there being a series of notches in the bar, and a draft-cable attached to the wagon near the pivotal point and adapted to be entered in the several notches.

In testimony whereof I have signed my name to this specification in the presence of two subscribing witnesses.

GEORGE STEVENSON.

Witnesses:
JOHN FREDERICK WOODHOUSE,
JOHN ALFRED HAGGITT.